United States Patent
Porikli et al.

(10) Patent No.: US 7,856,120 B2
(45) Date of Patent: Dec. 21, 2010

(54) JOINTLY REGISTERING IMAGES WHILE TRACKING MOVING OBJECTS WITH MOVING CAMERAS

(75) Inventors: Fatih M. Porikli, Watertown, MA (US); Xue Mei, Catonsville, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 935 days.

(21) Appl. No.: 11/693,862

(22) Filed: Mar. 30, 2007

(65) Prior Publication Data

US 2008/0240499 A1  Oct. 2, 2008

(51) Int. Cl.
*G06K 9/00* (2006.01)
(52) U.S. Cl. ...................... 382/103; 308/104
(58) Field of Classification Search ............... 382/103, 382/104; 348/143
See application file for complete search history.

(56) References Cited

U.S. PATENT DOCUMENTS

| | | | | |
|---|---|---|---|---|
| 5,434,617 A | * | 7/1995 | Bianchi | ................... 348/170 |
| 6,535,114 B1 | * | 3/2003 | Suzuki et al. | ................ 340/435 |
| 6,798,897 B1 | * | 9/2004 | Rosenberg | ................... 382/107 |
| 7,209,883 B2 | * | 4/2007 | Nefian | ........................ 704/256 |
| 2004/0071367 A1 | * | 4/2004 | Irani et al. | ................... 382/284 |
| 2005/0226464 A1 | * | 10/2005 | Sun et al. | ..................... 382/103 |
| 2007/0147661 A1 | * | 6/2007 | Fukaya et al. | ............... 382/104 |

OTHER PUBLICATIONS

Fred Hunter et al. "The Gaussian particle Filter for diagnosis of non-linear systems, 5th IFAC Symposium on Fault detection, supervision and safety of technical process (SAFEPROCESS 2003), vol. 3, Jan. 1, 2003".*

Peter Meer et at. ("covariance tracking using model update based on lie algebra", computer society conference on computer vision and pattern recognition, pp. 728-735. IEEE 2006).*

* cited by examiner

*Primary Examiner*—Vu Le
*Assistant Examiner*—Amara Abdi
(74) *Attorney, Agent, or Firm*—Dirk Brinkman; Gene Vinokur

(57) ABSTRACT

A method tracks a moving object by registering a current image in a sequence of images with a previous image. The sequence of images is acquired of a scene by a moving camera. The registering produces a registration result. The moving object is tracked in the registered image to produce a tracking result. The registered current image is registered with the previous image using tracking result for all the images in the sequence.

15 Claims, 2 Drawing Sheets

100

JOINTLY REGISTERING IMAGES WHILE TRACKING MOVING OBJECTS WITH MOVING CAMERAS

FIELD OF THE INVENTION

This invention relates generally to tracking an object in a sequence of images acquired of a scene by a camera, and more particularly to tracking the object when the camera is also moving.

BACKGROUND OF THE INVENTION

Object tracking is performed in many computer vision applications, such as surveillance, robotics, human computer interaction, vehicle tracking and medical imaging. Object tracking locates region of pixels in a sequence of images that matches a model of the moving object. In object tracking, the camera can be static or moving.

Tracking can be considered as an estimation of a state for a time series state space model. The problem can be formulated in probabilistic terms. Tracking methods have used Kalman filters to provide solutions that are optimal for a linear Gaussian model.

Mean Shift Tracking

A common object tacking method for images acquired by a static camera uses a mean shift procedure, which relies on a nonparametric density gradient estimator to locate a window of pixels in a current image that is most similar to a color histogram of the object. The mean shift procedure iteratively uses a kernel based search starting at a previous location of the object, U.S. patent application Ser. No. 11/097,400, filed by Porikli et al., on Mar. 1, 2005, "Tracking objects in low frame rate video," The success of the mean shift highly depends on the discriminating power of the histograms that model a probability density function of the object. The mean shift can be extended to track moving objects, which are changing in size, R. Collins, "Mean-shift blob tracking through scale space," Proc. IEEE Conf. on Comp. Vision Patt. Recog., pages 234-240, 2003. Color histograms are common models of nonparametric density, but histograms disregard the spatial arrangement of the feature values. Moreover, histograms do not scale to higher dimensions due to exponential size and sparsity.

Particle Filter Tracking

A particle filter estimates a sequence of hidden variables (particles) based on observed samples. The particle filter, also known as the sequential Monte Carlo method, can be used for object tracking. In this case, the hidden variables are the locations of the object, and the observed samples are image pixels. Particle filtering tracks the locations over time, typically by recursively constructing a multi-model probability distribution function (pdf) based on the samples, using Monte Carlo integration. When applied to tracking in computer vision applications, particle filtering is known as condensation, M. Isard and A. Blake, "Condensation—conditional density propagation for visual tracking," Int. J. Computer Vision, 29:5-28, 1998.

One method applies Rao-Blackwellization to integrate subspace representations in a particle filter framework, Z. Khan, T. Balch, and F. Dellaert, "rao-Blackwellized particle filter for eigentracking," Proc. IEEE Conf. on Comp. Vision and Patt. Recog., 2:980-986, 2004. They track an unmarked honey bee in a hive.

Subspace representations have been used successfully for tracking by finding a minimum distance from the tracked object to the subspace spanned by training data or previous tracking results. The particle filter is based on random sampling that becomes a problematic issue due to sample degeneracy and impoverishment, especially for higher dimensional representations. Keeping adding tracking results to the subspace will inevitably update the subspace with inaccurate tracking results. A particle tracker is prone to fail due to the contamination of the model subspace.

Classifier Based Tracking

Tracking can also be considered as a classification problem, see United States Patent Application 20060165258, "Tracking objects in videos with adaptive classifiers," filed by Avidan on Jan. 24, 2005. A classifier can be trained to distinguish a (foreground) object from the background. This is done by constructing a feature vector for every pixel in a reference image and training a classifier to separate pixels that belong to the object from pixels that belong to the background. One obvious drawback of local search methods is that they tend to get stuck into a local optimum.

Image Registration

Image registration establishes a common frame of reference for a sequence of images acquired by a camera of a scene taken over time, and from different views, or by different cameras. Image registration has a vital role in many computer vision applications, such as video tracking, medical imaging, remote sensing, super-resolution and data fusion, B. Zitova and J. Flusser, "Image registration methods: A survey," Image and Vision Computing, 21:977-1000, 2003.

In general, image registration methods can be classified into two categories: direct methods and feature-based methods. Direct methods use pixel-to-pixel matching, and minimize a measure of image similarity to find a parametric transformation between two images. Often, hierarchical approaches are adapted to improve convergence properties. Feature-based methods first extract distinctive features from each image. Then, the features are matched between the images to establish the correspondence, and to warp images according to parametric transformations estimated from those correspondences. Unlike direct methods, feature-based registration does not require initialization and can handle large motion and viewpoint changes between the images. However, finding distinctive features in the image that are invariant to illumination, scale and rotation is difficult.

Another method uses shift invariant features to register images, M. Brown and D. G. Lowe, "Recognising panoramas," IEEE International Conference on Computer Vision, pages 1218-1225, 2003. That method is insensitive to the ordering, orientation, scale and illumination of the images and removes 'outlier' images, which do not have any overlapping area with the other images. Due to the different characteristics of imaging sensors, the relationship between the intensities of corresponding pixels in multi-modality images is usually complex and unknown.

Conventional intensity based feature extraction fails in the case of multi-modality images. Mutual information based registration works for multi-modality images, J. Pluim, J. Maintz, and M. Viergever, "Mutual information based registration of medical images: a survey," IEEE Trans. on Medical Imaging, 8:986-1004, 2003.

Tracking Moving Objects with Moving Cameras

Tracking of independently moving objects in a sequence of images acquired by a moving camera is inherently more challenging and complex because the motion of the camera induces a motion in all pixels in the image sequence. One method models the scene in terms of a small group of motions, S. Ayer and H. S. Sawhney, "Layered representation of motion video using robust maximum-likelihood estimation of mixture models and MDL encoding," International Conference on Computer Vision, pages 777-784, 1995.

Another method estimate the number of motion models automatically, Y. Weiss and E. H. Adelson, "A unified mixture framework for motion segmentation: incorporating spatial coherence and estimating the number of models," Proc. IEEE Conf. on Comp. Vision and Patt. Recog., pages 321-326, 1996. They incorporate spatial constraints and given assumptions about the expected level of model failure. The tracking result highly depends on the quality of the registration, which is unreliable when the registration algorithm fails to achieve reasonable results.

SUMMARY OF THE INVENTION

The embodiments of the invention provide a method for tracking a moving object in a sequence of images acquired of a scene by a moving camera. This is difficult because both the background and foreground appear to be moving in the images. If the camera is stationary, there is only small movement, if any, in the background, making it relatively easy to track the moving foreground object. Tracking a moving object is difficult when the camera motion is substantially large.

Conventionally, image registration is applied to the sequence of images using parametric motion models before the tracking is done to compensate for the camera motion. This makes the tracking highly depends on the performance of the image registration. This raises problems when there are big moving objects in the scene. The registration is likely to fail because the tracker easily drifts away from the moving object when poor registration results occur.

The embodiments of the invention solve this problem by jointly registering the images while tracking the moving objects. The image registration and tracking use a single factorial hidden Markov model and particle filters. In this way, the registration and tracking assist each other by interacting and 'locking' on the object.

The background is registered according to geometric transformation parameters by maximizing a joint gradient function and the factorial hidden Markov model. A covariance tracker is used to track the moving object. A tracking score is obtained by incorporating both background and foreground information.

DETAILED DESCRIPTION OF THE PREFERRED EMBODIMENTS

Figure 1:
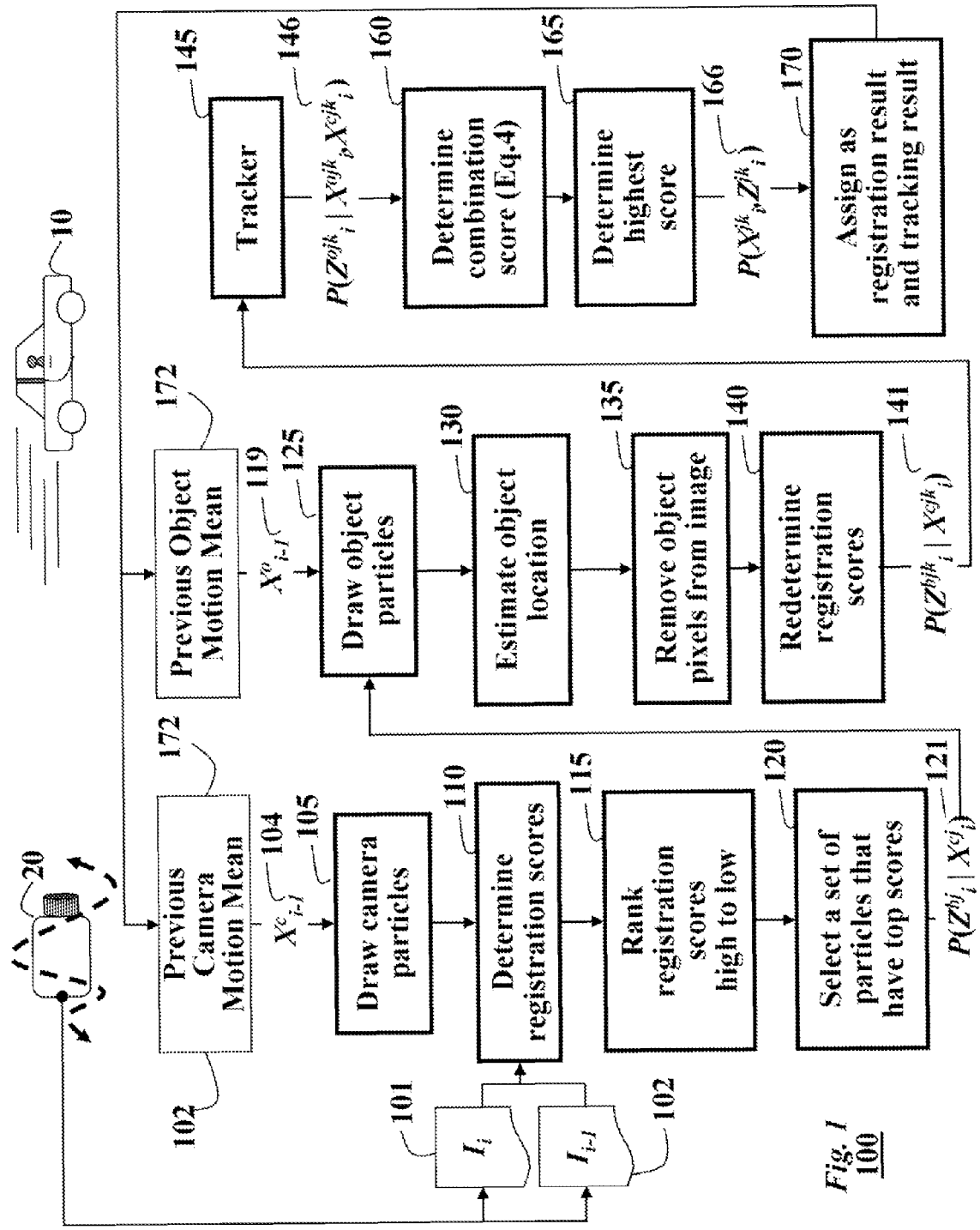
FIG. 1 is a flow diagram of a method for tracking a moving object according to an embodiment of the invention.

FIG. 1 shows a method 100 for tracking a moving object 10 in a sequence of registered images 101-102 acquired of a scene by a moving camera 20 according to an embodiment of our invention. In the method, the registering and tracking operate jointly and concurrently. That is, we use registration results and tracking result in both the image registration and the object tracking.

Initialization

During a one time initialization step, we detect a location of the moving object in the first two images using some known method, manual or automatic, e.g., by an object detection procedure. The moving object is removed (segmented) from the first two images to obtain the corresponding background images, which can then be registered. After the first two images, we have an initial camera (c) registration result $X^c_0$, and an initial object (o) tracking result $X^o_0$.

Then, for each next image i, where i=3, 4, . . . , we perform the following steps iteratively:

We draw 105 camera particles from a first Gaussian distribution. If we only want to track only affine motion in a plane of the image, then we draw about 300 particles. To track perspective motion as well, about 500 particles are drawn. The Gaussian distribution of the particles has a motion mean $X^c_{i-1}$ 104. Registration scores are determined 110 by registering two images, that is the current image $I_i$ 101 and the previous image $I_{i-1}$ 102 according to the parameters of the registration particles.

The registration scores are ranked 115 from high to low, and the top, e.g., ten, particles, which have the highest registration scores are selected 120. These particles are $X^{cj}_i$, where j=1, 2, . . . , 10, with corresponding probabilities $p(Z^{bj}_i|X^{cj}_i)$ 116 and b indicate the background.

Object particles, $X^{ojk}_i$, are drawn 125 from a second Gaussian distribution, which has the mean $X^o_{i-1}$ 124. We estimate 130 the object location, and remove 135 pixels corresponding to the object location from the image. This leaves the background image for the current image.

We use this updated background image to redetermine 140 the registration scores according to the object particles $X^{ojk}_i$ and updated camera particles $X^{cjk}_i$. That is, the current image is registered again (reregistered) with the previous image, but this time using the tracking results. The probabilities of the object-wise updated camera particles $X^{cjk}_i$ are $p(Z^{bjk}_i|X^{cjk}_i)$ 141, where k=1, 2, . . . , m, where m is the number of particles we draw for the object.

A tracker obtains 145 obtains tracking scores using the object and camera particles $X^{ojk}_i$, $X^{cjk}$ with probabilities are $p(Z^{ojk}i|X^{ojk}_i, X^{cjk})$ 146.

The registration scores 141 and the tracking scores 146 are applied to Equation 4 below to determine 160 a combination score of both image registration and object tracking.

We determine 165 a highest score with a probability $p(X^{jk}_i|Z^{jk}_i)$ 166, which is assigned as the registration result and tracking result, i.e., the camera motion 171 and the object motion 172.

The method is repeated for all images in the sequence with the current image becoming the previous image 102, and the next image the current image 101.

In other words, a first set of particles are drawn for camera motion. We determine the registration scores for the first set of particles and rank the registration scores from high to low. Then, we select a subset of the first set of particles for the camera motion. After, we draw the second set of particles using the subset of particles based on a motion of the object and estimate a location of the object using the second set of particles while removing pixels corresponding to the object from the current image. We update the registration scores and track the object using the second set of particles to obtain tracking scores. As a final stage, we combine the registration score and the highest tracking score to determine the registration and tracking results.

Note that, the particle filter can also be in the form of a single Gaussian distribution. In this case, each particle has a set of state variables for camera motion and another set of state variable for object motion, and the particles registering and tracking are drawn from that single distribution. Alternatively, we draw particles for registering the images from a single distribution while holding the object motion particles constant, and then, for tracking, the object motion particles are drawn while holding the camera motion particles constant. There can also be separate Gaussian distributions from which the camera and object motion particles are drawn respectively and independently.

Joint Registrations and Tracking

The unified reregistering method we describe for registration and tracking is not limited to a particle filter framework. The method can use different types of registration and tracking methods. For instance, we can achieve the registration by selecting feature points in images and fitting a parametric motion on the feature correspondences between two consecutive frames to find camera motion parameters. We can also obtain a list of camera motion parameters that give most accurate registration scores. We use the same feature selection process to determine features for the object, and track the object between the frames as described above.

In addition to particle filter and feature based frameworks, we extend the joint tracking and registration to other correspondence and warping estimation methods, such as additive image alignment, compositional image alignment, inverse additive alignment, block matching, optical flow, and many more.

Also, our method is not limited to parametric motion estimation methods. It can utilize, e.g., a non-parametric camera and object motion representations, and non-linear mappings.

Factorial Hidden Markov Model

Figure 2:
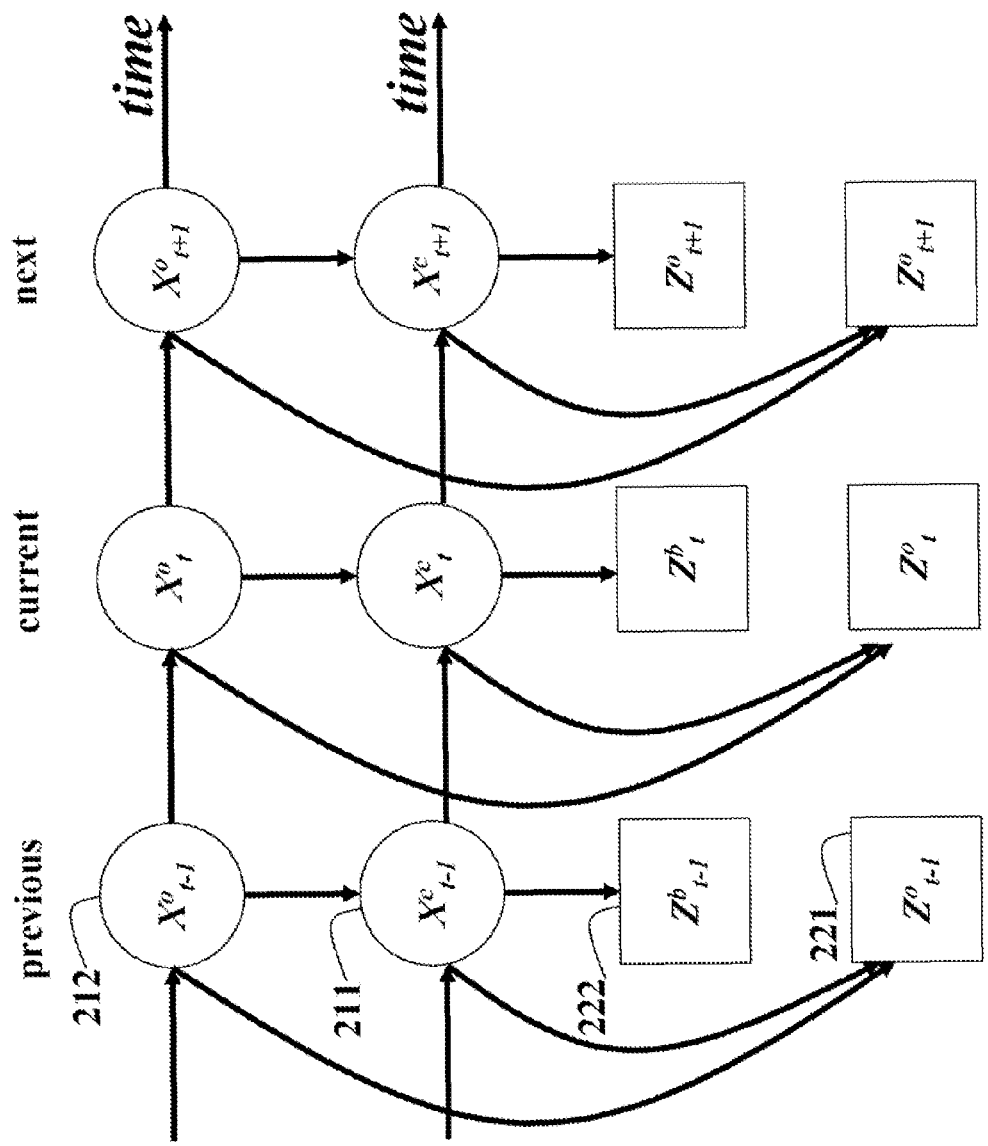
FIG. 2 is a block diagram of a factorial hidden Markov model according to an embodiment of the invention.

FIG. 2 shows conditional independence relations for a factorial hidden Markov model (FHMM) 200 used for image registration and object tracking according to embodiments of our invention. In a conventional FHMM, past information is conveyed through a single hidden state. The conventional FHMM generalizes the state by factorizing the hidden state into multiple state variables.

Instead of only factorizing the hidden state, we factorize both the observation and the hidden state. We describe a structured approximation to yield a tractable process, and infer the parameters by decoupling both the observation and state variables.

Our FHMM includes two parts: (1) a state we infer; and (2) an observation from the image sequence 101-102. In our model, a state variable $X_t$ is factored into camera motion (registration) parameters $X^c_t$ 211, and moving object motion (tracking) parameters $X^o_t$ 212, where the variable $X_t$ denotes a state X of the model at time t. Note, the time steps, e.g., t−1, t, and t+1, corresponds to the previous, current and next images. By jointly incorporating the registration and tracking variables in one FHMM model, the variables mutually assist each other by interacting.

The tracking and registration method infers $X_t = (X^o_t, X^c_t)$, based on all the evidence in the images $Z_t = \{Z_1, Z_2, \ldots, Z_t\}$, where $Z_t = (Z^o_t, Z^b_t)$ is the image observation at time t, and $Z^b_t$. We further factorize the observation $Z_t$ to two parts: a background observation $Z^b_t$ 221, and a moving object observation $Z^o_t$ 222. We denote object and camera particles as $X^{oj}_t$, $Z^{cj}_t$, respectively The tracking process can be described as density propagation, M. J. Black and A. D. Jepson, "Eigentracking: Robust matching and tracking of articulated objects using a view-based representation," Int. J. Computer Vision, 26:63-84, 1998, incorporated herein by reference. The density is propagated from $p(X_{t-1}|Z_{t-1})$. The propagation equation is $$p(X_t|Z_t) \propto p(Z_t|X_t) \int p(X_t|X_{t-1}) p(X_{t-1}|Z_{t-1}) dX_{t-1} \quad (1)$$

Because the camera motion and moving object motion are independent of each other, we have $$p(X_t|X_{t-1}) = p(X^o_t, X^c_t|X^o_{t-1}, X^c_{t-1}) \quad (2)$$
$$= p(X^o_t|X^o_{t-1}) p(X^c_t|X^c_{t-1}).$$

Because the background observation is independent of object motion, the observation probability given the state is $$p(Z_t|X_t) = p(Z^o_t, Z^b_t|X^o_t, X^c_t) \quad (3)$$
$$= p(Z^o_t|Z^b_t, X^o_t, X^c_t) p(Z^b_t|X^o_t, X^c_t)$$
$$= p(Z^o_t|X^o_t, X^c_t) p(Z^b_t|X^c_t).$$

Substituting Equation 2 and Equation 3 into Equation 1, we obtain $$p(X_t|Z_t) \propto p(Z^o_t|X^c_t) p(Z^b_t|X^c_t) \int p(X^o_t|X_{t-1}{}^o) p(X^c_t|X_{t-1}{}^c) p(X_{t-1}|Z_{t-1}) dX_{t-1} \quad (4)$$

Image Registration

In one embodiment of our invention, our image registration applies a novel similarity function on image pixels, which have high gradient magnitudes. A similarity function ensures a fast convergence.

Minimizing Pixel Intensities

Our gradient method estimates camera motion parameters a by minimizing intensity differences between the current image $I_1(x, y)$ and a warped previous $I_2(x, y, p)$. The estimation for the camera motion parameters a is $$a^* = \arg\min_a \sum_{(x_i, y_i) \in S} (I_1(x_i, y_i, a) - I_2(x_i, y_i))^2, \quad (5)$$

where $(x_i, y_i, a)$ is the coordinate of the corresponding pixel in the current image, after we warp the previous image by the motion parameters a, and S is the set of coordinates of pixels that are common to both images. Gardient descent is used to find the motion parameters by solving a least square linear equation.

Maximizing Pixel Gradient Magnitudes

Alternatively, we can register images by maximizing a joint spatial gradient magnitude in edge or energy images $E_1$ and $E_2$ generated from the current and previous $I_1$ and $I_2$. The edge images can be generated by applying a conventional, e.g., Canny, edge detector, J. Canny, "A computational approach to edge detection," IEEE Trans. on Pattern Analysis and Machine Intelligence, 8:679-698, 1986, incorporated herein by reference. Edges are locations where image has strong gradients corresponding to depth discontinuities. Applying maximization to the small set of edge pixels makes our method fast and more accurate.

In the energy images, the edge pixels have a magnitude of 1, while non-edge pixels have a magnitude of 0. The total energy in the sum of two correctly registered images is much higher than the total energy obtained for incorrect registrations. Using a maximization of joint gradient magnitudes, instead of minimization of their intensities, provides more accurate performance because image features are not necessarily collocated in both images.

In other words, our underlying assumption is not that the feature (intensity or gradient) values remain the same after motion compensation between the images as in the minimization. By maximizing the joint gradient magnitudes, we obtain the parametric camera motion transformation parameters α. Now, we define the camera motion parameters p in the energy images as $$a^* = \underset{a}{\mathrm{argmax}} \sum_{(x_i, y_i) \in S} (E_1(x_i, y_i, a) - E_2(x_i, y_i))^2, \quad (6)$$

where $E_1$ and $E_2$ represent respectively the edge (or energy) images of images $I_1$ and $I_2$.

Camera Motion Models

When the scene is approximated by a single depth plane, or the distance of the viewpoints between the two camera images is small relative to their distance from the scene, the motion between the two images can be modeled in terms of 2D affine transformation parameters. The unknown motion parameter vector is $$\vec{a} = (a_1, a_2, \ldots, a_m)$$

For an affine transformation, the model is given by $$x_i^2 = a_1 x_i^1 + a_2 y_i^1 + a_3$$
$$y_i^2 = a_4 x_i^1 + a_5 y_i^1 + a_6 \quad (7)$$

where $x^1_i, y^1_i$, and $x^2_i, y^2_i$ are the pixel coordinates before and after the transformation, respectively. In this case the camera motion parameter vector is $$\vec{a} = (a_1, a_2, a_3, a_4, a_5, a_6)$$

The corresponding project model for the camera motion is $$x_i^2 = \frac{a_1 x_i^1 + a_2 y_i^1 + a_3}{a_7 x_i^1 + a_8 y_i^1 + 1} \quad (8)$$
$$y_i^2 = \frac{a_4 x_i^1 + a_5 y_i^1 + a_6}{a_7 x_i^1 + a_8 y_i^1 + 1},$$

where the parameter vector is $$\vec{a} = (a_1, a_2, a_3, a_4, a_5, a_6, a_7, a_8)$$

Multiscale Image Representation

To improve the accuracy and speed of convergence, the iterative method as described above uses a coarse-to-fine hierarchical image representation. A spatial Gaussian pyramid is constructed for each image. Each pyramid level is constructed by applying a Gaussian low-pass filter to the previous level, followed by sub-sampling the image by a factor of two. The above estimations are performed in the coarse-to-fine order level using the estimated parameters as an initial guess. We set initial non-zero values only for the translational parameters $p_3$ and $p_6$, leaving all the other parameters to be zeros. This is set manually or by some initialization procedure.

Probability Representation

The probability of the registration result given the camera motion parameters is $$p(Z_t^b | X_t^c) = \exp\{F(X_t^c)\} \quad (9)$$

where $F(X_t^o) = \Sigma_{(xi, yi) \in S}(E_1(x_i, y_i, X_t^o) + E_2(x_i, y_i)^2$.

Particle Tracking with Covariance Features

A covariance based object description, which uses different types of features and modalities to successfully track non-rigid objects, is known, F. Porikli, O. Tuzel, and P. Meer. Covariance tracking using model update based on lie algebra. Proc. IEEE Conf. on Comp. Vision and Patt. Recog., pages 728-735, 2006, and U.S. patent application Ser. No. 11/305,427, "Method for Constructing Covariance Matrices from Data Features," filed on Dec. 14, 2005 by Porikli et al., both incorporated herein by reference.

For each image, a feature image is constructed. For a given object region, the covariance matrix of the features is determined. In the current image, the candidate regions are cropped according to the transformation parameters drawn with respect to the state distribution. The region that has a minimum covariance distance from the model is the tracking result.

We improve that method by using the particle filter to draw object motion parameters, which denote candidate object location. Instead of applying an exhaustive search in the local area for the location of the moving object, as in the prior art, we now draw particles for the candidate locations according to a normal distribution.

For an image I, the W×H×d dimensional feature image extracted from the image I, is a matrix F, where a feature vector is $$f_k = [xy I(x,y) I_x(x,y) I_y(x,y) \ldots]$$

where $I_x(x, y)$ and $I_y(x, y)$ are pixel gradient magnitudes with respect to x and y coordinates, respectively.

The covariance matrix CR of an M×N rectangular region R is a d×d matrix $$C_R = \frac{1}{MN} \sum_{k=1}^{MN} (f_k - \mu_R)(f_k - \mu_R)^T, \quad (10)$$

where μR is a vector of the means of the corresponding features for the pixels within the region R. The covariance matrix is a symmetric matrix, in which diagonal entries are variance of each feature and non-diagonal entries are correlations of the features. The similarity function is a sum of the squared logarithms of generalized eigenvalues, $$\rho(C_i, C_j) = \sqrt{\sum_{k=1}^{d} \ln^2 \lambda_k(C_i, C_j)}, \quad (11)$$

where $\gamma(C_i, C_j)$g are the generalized eigenvalues of the previous and current covariance matrices $C_i$ and $C_j$, determined from $$\gamma C_i x_k - C_j x_k = 0 \text{ for } k=1, 2, \ldots, d \quad (12)$$

and $x_k$ are the generalized eigenvectors. The similarity determines a distance or difference between the covariance matrices, For each image, we remove the cropped region, which has the smallest distance from the current object model. The best matching region determines the location of the object in the current image.

The probability of the tracking result, given the camera motion parameters and moving object parameters is $$p(Z^o_t | X^o_p, X^o_t) = \exp\{-\alpha\} \tag{13}$$

Effect of the Invention

The embodiments of our invention provide a method for registering images, while tracking an object in the images. By registering background images, we compensate for the motion of the camera movement, and the registration and tracker work together to achieve accurate tracking results.

Our method concurrently handles registration and tracking. Under this framework, tracking and registration are not working separately as in the prior, but mutually assist each other by interacting. We describe a fast image registration procedure, which improves the performance of the gradient based image registration. Our method uses a joint gradient function and is fast in convergence and robust to outliers. We improve a covariance matrix tracker by using a particle filter. This avoids exhaustive searching in a local area, which is prone to fail in the large motion induced by the camera movements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method for tracking a moving object, comprising the steps of:
registering a current image in a sequence of images with a previous image, in which the sequence of images is acquired of a scene by a moving camera, and in which the registering produces a registration result;
tracking a moving object in the registered image to produces a tracking result, in which the registering and the tracking use a factorial hidden Markov model, in which the factorial hidden Markov model has a state variable for the current image, and further comprising:
factoring the state variable into registration parameters and motion parameters;
reregistering the registered current image with the previous image using the tracking result; and
repeating the registering, tracking and registering steps by making the current image the previous image and a next image in the sequence of images the current image.

2. The method of claim 1, further comprising:
initializing the registration result and the tracking result using the first two images in the sequence of images.

3. The method of claim 1, in which the registration and the tracking uses a particle filter with particles drawn according to a first and second Gaussian distribution corresponding to the registration and tracking results, respectively.

4. The method of claim 1, in which the registering further comprises:
minimizing an intensity difference between the previous image and the current image.

5. The method of claim 1, in which the registering further comprises:
maximizing a joint spatial gradient magnitude of a previous energy image and a current energy image respectively generated from the previous and current images.

6. The method of claim 5, in which the energy images are generated using an edge detector.

7. The method of claim 1, further comprising:
representing the sequence of image in a coarse-to-fine hierarchical representation using a spatial Gaussian pyramid.

8. The method of claim 3, further comprising:
modeling the moving object in the previous image and the current image with a previous covariance matrix and previous covariance matrix constructed from features in the previous image and the current image, respectively; and
determining a difference of previous and current covariance matrix, the difference being the tracking result.

9. The method of claim 8, in which the features are pixel gradient magnitudes.

10. The method of claim 8, in which the covariance matrix a symmetric matrix, in which diagonal entries are variance of each feature and non-diagonal entries are correlations of the features.

11. The method of claim 8, in which the difference is a sum of the squared logarithms of generalized eigenvalues of the previous and current matrices.

12. The method of claim 1, in which the registering and tracking is performed by a unified framework, such that the registering and tracking is joint.

13. The method of claim 12, in which the unified frame work is a particle filter.

14. The method of claim 12, in which the unified framework selects feature in the images and fits a parametric motion on the features correspondences between the previous and current images to determine camera motion and object motion parameters.

15. The method of claim 12, in which the unified framework uses non-parametric camera and object motion representations.

* * * * *